United States Patent
Wada et al.

(10) Patent No.: US 10,099,689 B2
(45) Date of Patent: Oct. 16, 2018

(54) VEHICLE TRAVEL SUPPORT SYSTEM AND VEHICLE TRAVEL SUPPORT METHOD

(71) Applicant: HONDA MOTOR CO., LTD., Tokyo (JP)

(72) Inventors: Takuji Wada, Wako (JP); Hiroyuki Koibuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 15/018,103

(22) Filed: Feb. 8, 2016

(65) Prior Publication Data
US 2016/0229399 A1    Aug. 11, 2016

(30) Foreign Application Priority Data
Feb. 10, 2015    (JP) .................................. 2015-024465

(51) Int. Cl.
*B60R 21/00* (2006.01)
*B60W 30/12* (2006.01)
(Continued)

(52) U.S. Cl.
CPC ............ *B60W 30/12* (2013.01); *B60W 10/04* (2013.01); *B60W 10/18* (2013.01); *B60W 10/20* (2013.01);
(Continued)

(58) Field of Classification Search
CPC ...... B60W 30/12; B60W 10/20; B60W 10/18; B60W 10/04; B60W 50/0097;
(Continued)

(56) References Cited

U.S. PATENT DOCUMENTS

2014/0032072 A1* 1/2014 Yoshihama ............... B60T 7/18
701/70
2014/0172235 A1* 6/2014 Werling ............... B62D 15/025
701/41
(Continued)

FOREIGN PATENT DOCUMENTS

JP    11-147473 A    6/1999
JP    2001-109999 A    4/2001
(Continued)

OTHER PUBLICATIONS

Machine Translation of JP2009-292345, printed Sep. 14, 2017.*
(Continued)

*Primary Examiner* — Alan D Hutchinson
(74) *Attorney, Agent, or Firm* — Westerman, Hattori, Daniels & Adrian, LLP

(57) ABSTRACT

In a vehicle travel support system or a vehicle travel support method, a control apparatus estimates a travel path of a vehicle on the basis of the present position of the vehicle and map information, acquires from a map information storage apparatus a curve radius that is of a curve included in the travel path and that is contained in the map information, performs a vehicle turning support or a deceleration support prior to entry to the curve on the basis of a start point of the curve which is detected on the basis of front images, and performs the vehicle turning support for the curve by using the curve radius contained in the map information.

15 Claims, 8 Drawing Sheets

(51) Int. Cl.
*B62D 5/04* (2006.01)
*B60W 50/00* (2006.01)
*B60W 10/04* (2006.01)
*B60W 10/18* (2012.01)
*B60W 10/20* (2006.01)
*B60W 30/18* (2012.01)

(52) U.S. Cl.
CPC .. *B60W 30/18145* (2013.01); *B60W 50/0097* (2013.01); *B60W 2420/42* (2013.01); *B60W 2550/146* (2013.01); *B60W 2550/402* (2013.01); *B60W 2720/10* (2013.01)

(58) Field of Classification Search
CPC ....... B60W 30/18145; B60W 2720/10; B60W 2550/402; B60W 2550/146; B60W 2420/42
See application file for complete search history.

(56) References Cited

U.S. PATENT DOCUMENTS

2014/0288785 A1* 9/2014 Bretzigheimer .... B60T 8/17558
701/48

2015/0278614 A1* 10/2015 Lee ................... G06K 9/00798
348/148

FOREIGN PATENT DOCUMENTS

| | | |
|---|---|---|
| JP | 2006-178675 A | 7/2006 |
| JP | 2007-1579 A | 1/2007 |
| JP | 2009-292345 A | 12/2009 |
| JP | 2009292345 A * | 12/2009 |
| JP | 4654208 B2 | 3/2011 |
| JP | 2012-27760 A | 2/2012 |
| JP | 2012-79119 A | 4/2012 |
| WO | 2014/097541 A1 | 6/2014 |

OTHER PUBLICATIONS

Office Action dated Jul. 26, 2016, issued in counterpart Japanese Application No. 2015-024465. (5 pages).
Office Action dated Jan. 31, 2017, issued in counterpart Japanese Patent Application No. 2015-024465, with machine translation. (6 pages).

* cited by examiner

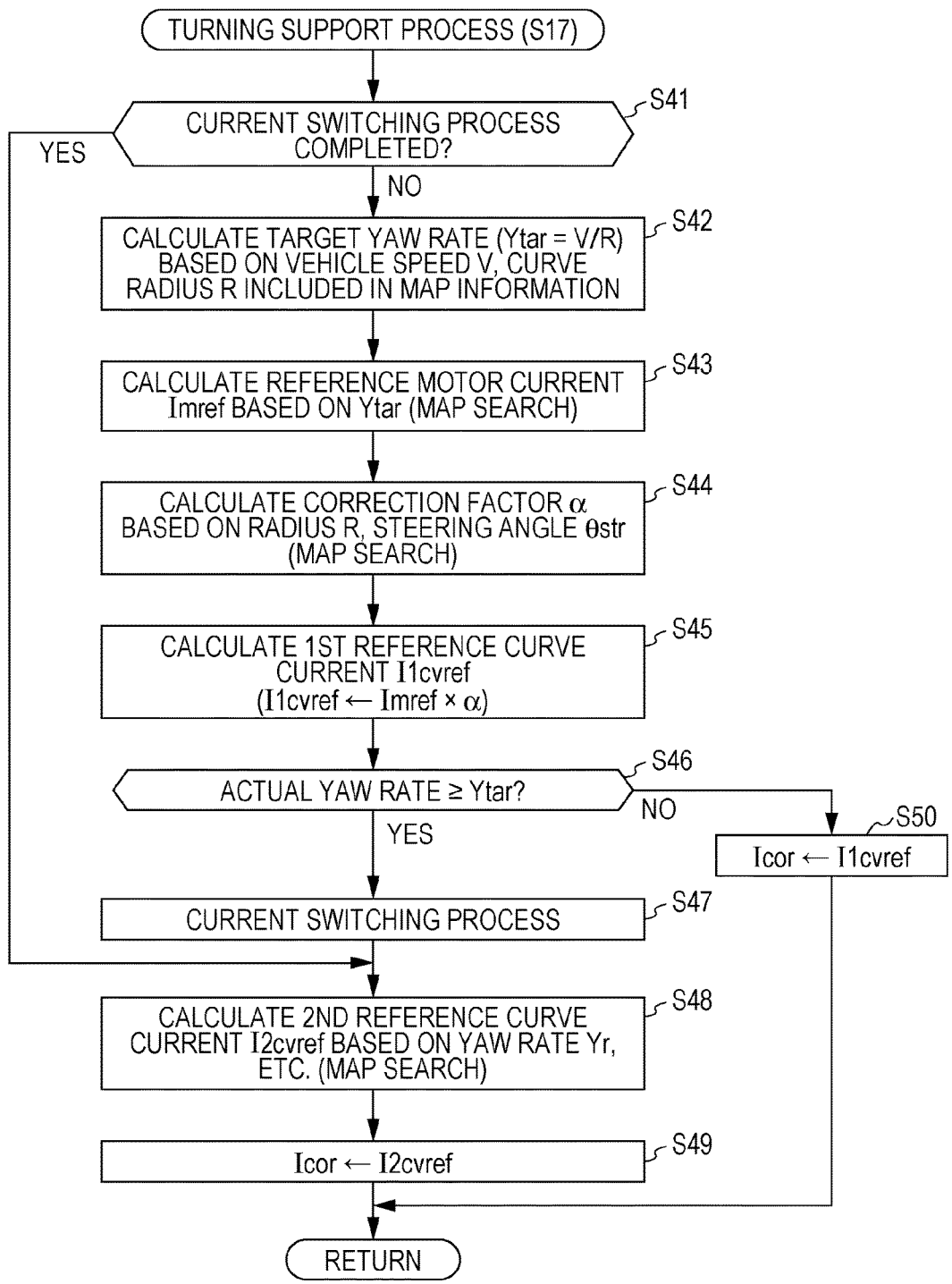

VEHICLE TRAVEL SUPPORT SYSTEM AND VEHICLE TRAVEL SUPPORT METHOD

CROSS REFERENCES TO RELATED APPLICATIONS

The present application claims priority under 35 U.S.C. § 119 to Japanese Patent Application No. 2015-024465, filed Feb. 10, 2015, entitled "Vehicle Travel Support System and Vehicle Travel Support Method." The contents of this application are incorporated herein by reference in their entirety.

TECHNICAL FIELD

The present disclosure relates to a vehicle travel support system and a vehicle travel support method that perform vehicle travel support by using steering assist torque produced by an actuator.

BACKGROUND

Japanese Unexamined Patent Application Publication No. 2012-027760 discloses a system that performs lane keeping support and lane departure warning (see paragraph and the abstract). According to Japanese Unexamined Patent Application Publication No. 2012-027760, a lane detection unit 10 detects a lane on the basis of an image taken by an image pickup unit 2 (paragraph [0012] in the publication). A lane keeping support unit 11 calculates a steering angle needed in order to keep the vehicle in the present lane and operates a steering motor 5 via a power steering control unit 6 (paragraph [0012]). A lane departure warning apparatus 12 determines a possibility of the vehicle departing from the lane on the basis of lane information detected by the lane detection unit 10, and produces an alarm to the driver if it is determined that the vehicle is to depart from the lane (paragraph [0012]). According to Japanese Unexamined Patent Application Publication No. 2012-027760, if a curve radius from the navigation apparatus 13 is equal to or less than a pre-set value, the lane departure warning apparatus 12 notifies the driver by voice or the like that the lane keeping support or the lane departure warning will become invalid (paragraph [0013]).

Japanese Patent No. 4654208 discloses a lane departure prevention system or the like that acquires information about the environment around a host vehicle by using a vehicle-mounted camera 3a and supports in the driving of the host vehicle and produces alarms to occupants of the vehicle (paragraph [0010]).

Neither Japanese Unexamined Patent Application Publication No. 2012-027760 nor Japanese Patent No. 4654208 provides any consideration that focuses on the vehicle travel support during a turn along a curve.

Accordingly, the present application describes a vehicle travel support system and a vehicle travel support method capable of more suitably performing the vehicle travel support when the vehicle turns a curve.

A vehicle travel support system according to a first aspect of the disclosure includes an image pickup apparatus that takes a front image of a view ahead of a vehicle, a lane detection apparatus that detects a lane indicated on a travel path of the vehicle from the front image acquired by the image pickup apparatus, a position detection apparatus that detects a present position of the vehicle, a map information storage apparatus that stores map information, an actuator that generates a steering assist force, and a control apparatus that assists in keeping the vehicle in the lane or avoiding departure of the vehicle from the lane by causing the actuator to generate the steering assist force. The control apparatus estimates the travel path of the vehicle based on the present position of the vehicle and the map information, acquires, regarding a curve included in the travel path, a curve radius contained in the map information from the map information storage apparatus, performs at least one of a vehicle turning support and a deceleration support prior to entry to the curve, based on a start point of the curve which is detected based on the front image, and performs the vehicle turning support for the curve by using the curve radius contained in the map information.

According to the first aspect of the disclosure, the vehicle turning support or the deceleration support prior to entry to the curve is performed on the basis of the start point of the curve which is detected on the basis of front images taken by the image pickup apparatus and the vehicle turning support for the curve is performed by using the curve radius contained in the map information. Therefore, it becomes possible to perform a suitable deceleration support or a suitable vehicle turning support with reference to the start point of the curve detected with high accuracy by using front images and perform a highly accurate vehicle turning support for a curve based on the map information.

The control apparatus may start the vehicle turning support for the curve which uses the curve radius, when steering is performed by a driver of the vehicle. Therefore, it becomes possible to perform a vehicle turning support that reflects tastes of the driver. Furthermore, it also becomes possible to prevent a sense of strangeness about the steering assist force from being given to the driver.

In the foregoing vehicle travel support system, the control apparatus may compute a first steering assist force that is the steering assist force that reflects at least one of a target yaw rate and a target lateral acceleration that are based on the curve radius and vehicle speed and also computes a second steering assist force that is the steering assist force that reflects the vehicle speed and at least one of vehicle yaw rate and lateral acceleration, and may start the vehicle turning support based on the first steering assist force, subsequently change the steering assist force gradually or stepwise from the first steering assist force to the second steering assist force, and then perform the vehicle turning support using the second steering assist force. Thus, it is possible to perform a smooth transition from the first steering assist force that reflects the curve radius to the second steering assist force that reflects the vehicle yaw rate.

The control apparatus may cause the steering assist force to be generated by using as a reference a start point of the curve which is detected based on the front image. Thus, even if the driver does not perform steering or the amount of steering performed is small, the steering assist force is generated so that the vehicle can smoothly turn the curve.

The control apparatus, while performing the vehicle turning support for the curve by using the curve radius contained in the map information, may reduce the steering assist force so that the vehicle turning support ends at an end point of the curve which is detected based on the front image. Thus, the vehicle turning support for the curve which uses the radius of the curve contained in the map information can be ended in accordance with the end point of the curve detected on the basis of front images. Therefore, the vehicle turning support can be highly accurately ended.

A vehicle travel support system according to a second aspect of the disclosure includes a position detection apparatus that detects a present position of a vehicle, a map information storage apparatus that stores map information, an actuator that generates a steering assist force, and a control apparatus that assists in keeping the vehicle in a lane or avoiding departure of the vehicle from the lane by causing the actuator to generate the steering assist force. The control apparatus estimates a travel path of the vehicle based on the present position of the vehicle and the map information, acquires, regarding a curve included in the travel path, a curve radius contained in the map information from the map information storage apparatus, performs at least one of a deceleration support and a vehicle turning support based on a current that maintains at least one of a vehicle yaw rate and a lateral acceleration that occur on the vehicle, and performs the vehicle turning support for the curve by using the curve radius contained in the map information.

According to the second aspect of the disclosure, at least one of the vehicle turning support and the deceleration support based on the current that maintains at least one of the lateral acceleration and the vehicle yaw rate is performed and the vehicle turning support for the curve by using the curve radius thereof contained in the map information is performed. Therefore, it becomes possible to perform the vehicle turning support or the deceleration support that maintains the lateral acceleration of the vehicle yaw rate and perform a highly accurate vehicle turning support for a curve based on the map information.

The control apparatus may cause the steering assist force to be generated before the vehicle enters the curve. This makes it possible to notify the driver in advance that the vehicle turning support will be performed for the curve.

The control apparatus may determine a delay of an actual steering timing at which steering is performed by a driver of the vehicle from a reference steering timing that is a steering timing set with reference to a start point of the curve and may advance a start timing of starting the steering assist force prior to entry to the curve, according to the delay of the actual steering timing. Therefore, the timing of starting the steering assist force prior to entry to the curve can be adjusted according to the skill of the driver.

In the foregoing vehicle travel support system, if the vehicle has passed a steering-requiring position set with reference to the start point of the curve contained in the map information while the driver does not operate the steering wheel, the control apparatus determines from the front image that there is departure of the vehicle from the lane or possibility of departure of the vehicle from the lane, then the control apparatus may cause the steering assist force to be generated in order to avoid or recover from departure of the vehicle from the lane. Thus, in the determination regarding departure of the vehicle from the lane based on front images, the use of the information about the start point of the curve contained in the map information makes it possible to highly accurately determine the need for a lane departure avoidance or recovery process.

According to a third aspect of the disclosure, there is provided a vehicle travel support method that uses a vehicle travel support system that includes an image pickup apparatus that takes a front image of a view ahead of a vehicle, a lane detection apparatus that detects a lane indicated on a travel path of the vehicle from the front image acquired by the image pickup apparatus, a position detection apparatus that detects a present position of the vehicle, a map information storage apparatus that stores map information, an actuator that generates a steering assist force, and a control apparatus that assists in keeping the vehicle in the lane or avoiding departure of the vehicle from the lane by causing the actuator to generate the steering assist force. The vehicle travel support method includes causing the control apparatus to estimate the travel path of the vehicle based on the present position of the vehicle and the map information, acquire, regarding a curve included in the travel path, a curve radius contained in the map information from the map information storage apparatus, perform a vehicle turning support or a deceleration support prior to entry to the curve, based on a start point of the curve which is detected based on the front image, and perform the vehicle turning support for the curve by using the curve radius contained in the map information, when steering is performed by a driver of the vehicle.

According to a fourth aspect of the disclosure, there is provided a vehicle travel support method that uses a vehicle travel support system that includes an image pickup apparatus that takes a front image of a view ahead of a vehicle, a lane detection apparatus that detects a lane indicated on a travel path of the vehicle from the front image acquired by the image pickup apparatus, a position detection apparatus that detects a present position of the vehicle, a map information storage apparatus that stores map information, an actuator that generates a steering assist force, and a control apparatus that assists in keeping the vehicle in the lane or avoiding departure of the vehicle from the lane by causing the actuator to generate the steering assist force. The vehicle travel support method includes causing the control apparatus to estimate the travel path of the vehicle based on the present position of the vehicle and the map information, acquire, regarding a curve included in the travel path, a curve radius contained in the map information from the map information storage apparatus, and reduce, while performing the vehicle turning support for the curve by using the curve radius contained in the map information, the steering assist force so that the vehicle turning support ends at an end point of the curve which is detected based on the front image.

According to this disclosure, during the vehicle turning support for a curve by using the curve radius contained in the map information, the steering assist force is reduced so that the vehicle turning support will end at the end point of the curve which is detected on the basis of front images. Therefore, it becomes possible to perform a highly accurate vehicle turning support for a curve based on the map information and end the vehicle turning support at an appropriate timing with reference to the end point of the curve which is detected with high accuracy by using front images.

According to the disclosure, it becomes possible to more suitably perform the vehicle travel support when the vehicle turns a curve. It also becomes possible to prevent a sense of strangeness about the steering assist force from being given to the driver of the vehicle.

BRIEF DESCRIPTION OF THE DRAWINGS

The advantages of the disclosure will become apparent in the following description taken in conjunction with the following drawings.

FIG. 8 is a flowchart of the vehicle turning support process (details of step S17 in FIG. 3) in the embodiment.

DETAILED DESCRIPTION

Figure 1:
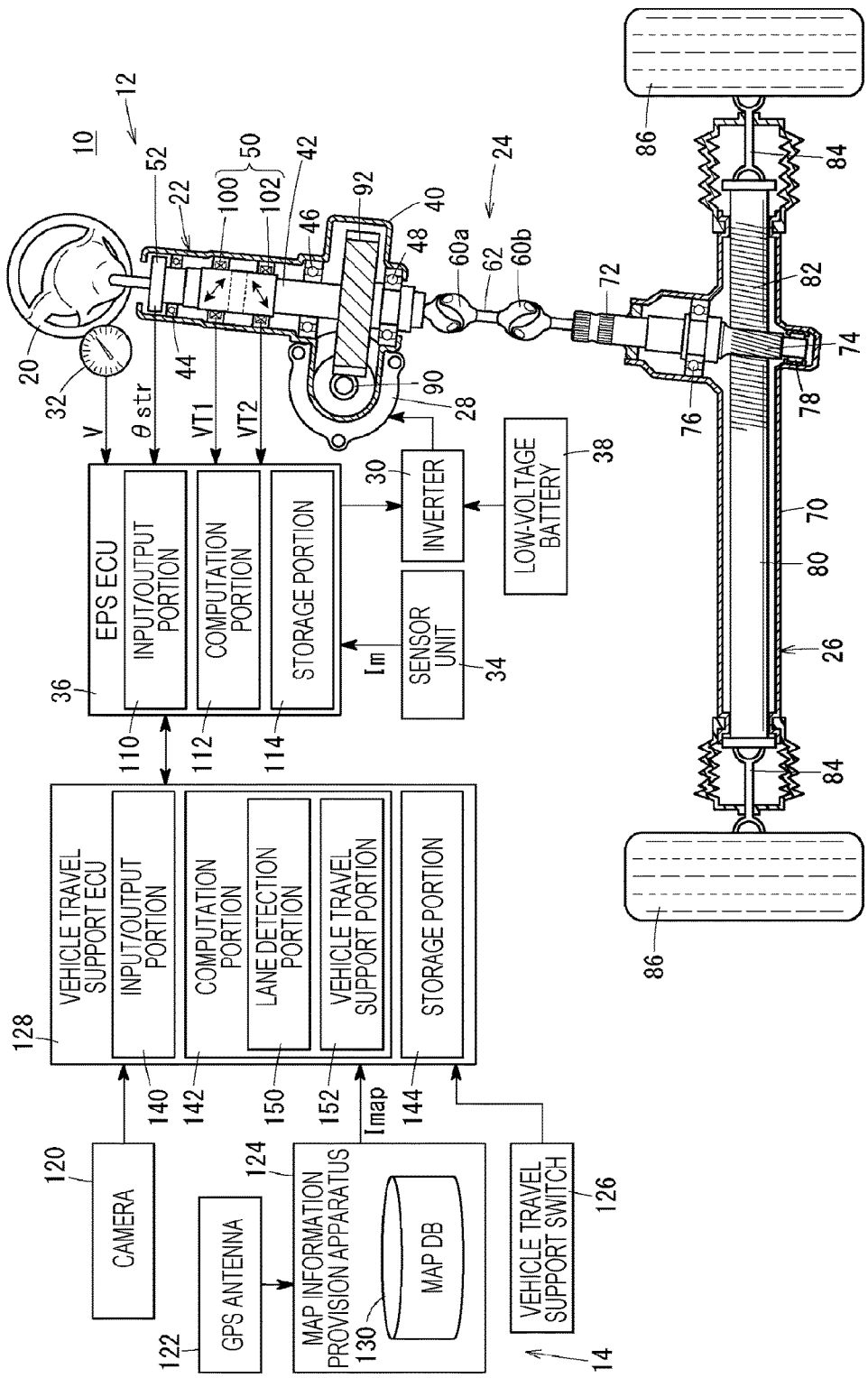
FIG. 1 is a general construction diagram of a vehicle equipped with a vehicle travel support system according to an embodiment of the present disclosure.

A. One Embodiment
A1. Description of Overall Construction
A1-1. Overall Construction FIG. 1 is a general construction diagram of a vehicle 10 equipped with a vehicle travel support system 14 (hereinafter, also referred to as "support system 14") according to an embodiment of the present disclosure. As shown in FIG. 1, the vehicle 10 has an electric power steering apparatus 12 (hereinafter, referred to as "EPS apparatus 12") as well as the support system 14.

A1-2. EPS Apparatus 12
A1-2-1. Overview of EPS Apparatus 12

The EPS apparatus 12 includes a steering wheel 20, a steering column 22, an intermediate joint 24, a steering gear box 26, an motor 28 for the EPS apparatus 12 (hereinafter, also referred to as "EPS motor 28"), an inverter 30 (hereinafter, also referred to as "EPS inverter 30"), a vehicle speed sensor 32, a sensor unit 34, an electric power steering electronic control unit 36 (hereinafter, referred to as "EPS ECU 36" or "ECU 36"), and a low-voltage battery 38 (hereinafter, also referred to as "battery 38").

The steering column 22 includes a casing 40, a steering shaft 42 supported within the casing 40 by the bearings 44, 46 and 48, a torque sensor 50, and a steering angle sensor 52.

The intermediate joint 24 includes two universal joints 60a and 60b and a shaft portion 62 disposed between the two universal joints 60a and 60b.

The steering gear box 26 includes a casing 70, a pinion shaft 72 provided with a pinion 74 of a rack-and-pinion mechanism and supported by bearings 76 and 78, a rack shaft 80 having rack teeth 82 of the rack-and-pinion mechanism, and tie rods 84.

A1-2-2. Manual Steering System

One end of the steering shaft 42 is fixed to the steering wheel 20 and the other end thereof is connected to the universal joint 60a. The universal joint 60a connects the other end of the steering shaft 42 and one end of the shaft portion 62. The universal joint 60b connects the other end of the shaft portion 62 and one end of the pinion shaft 72. The pinion 74 of the pinion shaft 72 and the rack teeth 82 formed on the rack shaft 80 movable back and force in a vehicle width direction mesh with each other. Two opposite ends of the rack shaft 80 are connected to left and right front wheels 86 (steering road wheels) via the tie rods 84.

Therefore, the steering torque Tstr (rotation force) caused by a driver operating the steering wheel 20 is transferred to the pinion shaft 72 via the steering shaft 42 and the intermediate joint 24. Then, the steering torque Tstr is converted into thrust by the pinion 74 of the pinion shaft 72 and the rack teeth 82 of the rack shaft 80, and the rack shaft 80 is displaced in a vehicle width direction. As the rack shaft 80 is displaced, the tie rods 84 steer the front wheels 86, whereby vehicle 10 can change its direction.

The steering shaft 42, the intermediate joint 24, the pinion shaft 72, the rack shaft 80, and the tie rods 84 constitute a manual steering system that transfers the driver's steering action on the steering wheel 20 directly to the front wheels 86.

A1-2-3. Steering Assist System
A1-2-3-1. Assist Drive System

The EPS motor 28 is connected to the steering shaft 42 via a worm gear 90 and a worm wheel gear 92. That is, an output shaft of the EPS motor 28 is connected to the worm gear 90. Furthermore, the worm wheel gear 92 in mesh with the worm gear 90 is formed elastically and integrally with the steering shaft 42.

In this embodiment, the EPS motor 28 is, for example, of a three-phase alternating-current brushless type. However, the EPS motor 28 may also be of another type such as a three-phase alternating-current brush type, a single-phase alternating-current type, or a direct-current type. The EPS motor 28 is supplied with electric power from the low-voltage battery 38 via the EPS inverter 30 that is controlled by the EPS ECU 36. Thus, the EPS motor 28 generates drive force Fm (hereinafter, also referred to as "motor drive force Fm" or "steering assist force Fm") commensurate with the supplied electric power. The motor drive force Fm is transferred to the rack shaft 80 via the output shaft of the EPS motor 28, the worm gear 90, the steering shaft 42 (the worm wheel gear 92), the intermediate joint 24, and the pinion shaft 72. The EPS motor 28, the worm gear 90, and the steering shaft 42 (the worm wheel gear 92) constitute an assist drive system that generates drive force for steering (the steering assist force Fm).

The steering assist force Fm in this embodiment can include a component of input amplification force Famp and a component of vehicle travel support force Fda. The input amplification force Famp is a drive force that amplifies the input torque from the driver to the steering wheel 20 (the steering torque Tstr), acting in the same direction as the steering torque Tstr, so as to assist the driver in steering. As described later, a drive force that acts in the opposite direction to the input amplification force Famp can also be generated. The vehicle travel support force Fda is a drive force that is generated and used independently of the steering torque Tstr in order to assist in the traveling of the vehicle 10 (particularly, the turning along a curve 304 (FIG. 4)).

A1-2-3-2. Assist Control System

The torque sensor 50, the vehicle speed sensor 32, the EPS inverter 30, the sensor unit 34, and the EPS ECU 36 constitute an assist control system that controls the assist drive system. The assist drive system, the assist control system, and the low-voltage battery 38 combined will be collectively termed the steering assist system as well below. In this embodiment, the output of the EPS motor 28 is controlled by a so-called vector control that uses the d-axis and the q-axis.

(a) Feed-forward System Sensors

The torque sensor 50 is a magnetostriction type sensor having high bending and torsional rigidities which is obtained by treating the steering shaft 42 directly with magnetostriction plating. The torque sensor 50 includes a first detection element 100 and a second detection element 102 of the magnetostriction type. Each of the first detection element 100 and the second detection element 102 is a magnetostriction film. The first detection element 100 outputs to the EPS ECU 36 a voltage (rightward-direction torque voltage VT1) commensurate with the torque (rightward-direction torque Tsr) in a clockwise direction when the steering wheel 20 is viewed from the driver side. The second detection element 102 outputs to the EPS ECU 36 a voltage (leftward-direction torque voltage VT2) commensurate with the torque (leftward-direction torque Tsl) in the counterclockwise direction when the steering wheel 20 is viewed from the driver side.

The vehicle speed sensor 32 detects the vehicle speed V [km/h] and outputs it to the EPS ECU 36. The steering angle sensor 52 detects a steering angle θstr [degree] that indicates the amount of steering of the steering wheel 20, and outputs it to the EPS ECU 36. The rightward-direction torque voltage VT1, the leftward-direction torque voltage VT2, the vehicle speed V, and the steering angle θstr are used for the feed-forward control by the EPS ECU 36.

(b) EPS Inverter 30

The EPS inverter 30 has a three-phase bridge type construction, performs a direct-current/alternating-current conversion of converting the direct current from the low-voltage battery 38 into three-phase alternating current, and supplies the alternating current to the EPS motor 28.

(c) Feedback System Sensors

The sensor unit 34 detects q-axis current that is a torque current component in the vector control (hereinafter, referred to as "motor current Im"). In this embodiment, the motor current Im is defined to be positive in value when the rotation direction of the motor 28 is a first direction (e.g., such a direction as to turn the vehicle 10 in the rightward direction) and negative in value when the rotation direction of the motor 28 is a second direction (e.g., such a direction as to turn the vehicle 10 in the leftward direction). However, if the first direction and the second direction can be separately determined, the motor current Im may be controlled as being positive in value.

The sensor unit 34 includes a current sensor (not shown in the drawings) that detects an electric current having at least two phases of the U, V and W phases in the winding wire (not shown) of the EPS motor 28, a resolver (not shown) that detects the electrical angle θ that is the rotation angle of an output shaft (not shown) or an outer rotor (not shown) of the EPS motor 28, and a q-axis current computation portion that computes a q-axis current (motor current Im) on the basis of the current having at least two phases and the electrical angle. Incidentally, the function of the q-axis current computation portion may also be realized by the EPS ECU 36.

(d) EPS ECU 36

As shown in FIG. 1, the EPS ECU 36 has a hardware construction that includes an input/output portion 110, a computation portion 112, and a storage portion 114. The EPS ECU 36 controls the output of the EPS motor 28 via the EPS inverter 30 on the basis of output values of various sensors. The computation portion 112 executes a steering assist control that controls the steering assist force Fm (=the motor drive force Fm) for assisting the driver in steering.

A1-2-3-3. Low-voltage Battery 38

The low-voltage battery 38 is an electricity storage apparatus capable of outputting low voltage (12 volt in this embodiment) and may be, for example, a secondary cell such as a lead storage battery.

A1-3. Vehicle Travel Support System 14

A shown in FIG. 1, the vehicle travel support system 14 includes a front camera 120 (hereinafter, also referred to as "camera 120"), a GPS antenna 122, a map information provision apparatus 124, a vehicle travel support switch 126, and a vehicle travel support electronic control unit 128 (hereinafter, referred to as "vehicle travel support ECU 128" or "ECU 128").

The camera 120 is mounted at an inward side of the windshield in front of a rearview mirror, and captures white lines at both sides of a road surface ahead of the vehicle 10 (lane lines 308 (FIG. 4)) as images (front images If) when the vehicle travel support switch 126 is on. The camera 120 outputs image information Ic regarding the front images If to the vehicle travel support ECU 128.

The GPS antenna 122 receives signals from a plurality of GPS satellites present in the sky above the vehicle 10 (GPS signals) and outputs the GPS signals to the map information provision apparatus 124.

The map information provision apparatus 124 specifically determines the present position Pc of the vehicle 10 on the basis of output of the GPS antenna 122 and provides the EPS ECU 36 with information regarding the present position Pc and its surroundings (hereinafter, also referred to as "map information Imap"). The map information Imap includes not only the present position Pc but also a radius R of the curve 304 (hereinafter, also referred to as "curve radius R"), the distance Lin to an entrance of the curve 304 (hereinafter, also referred to as "starting point distance Lin"), and the distance Lout to an exit of the curve 304 (hereinafter, also referred to as "ending point distance Lout").

The map information Imap is stored in a map information database 130 (hereinafter, referred to as "map DE 130") of the map information provision apparatus 124. The map information provision apparatus 124 specifically determines the present position Pc of the vehicle 10 on the basis of the GPS signal received by the GPS antenna 122. Then, the map information provision apparatus 124 reads the map information Imap from the map DE 130 on the basis of the present position Pc, and provides the information to the EPS ECU 36.

Figure 4:
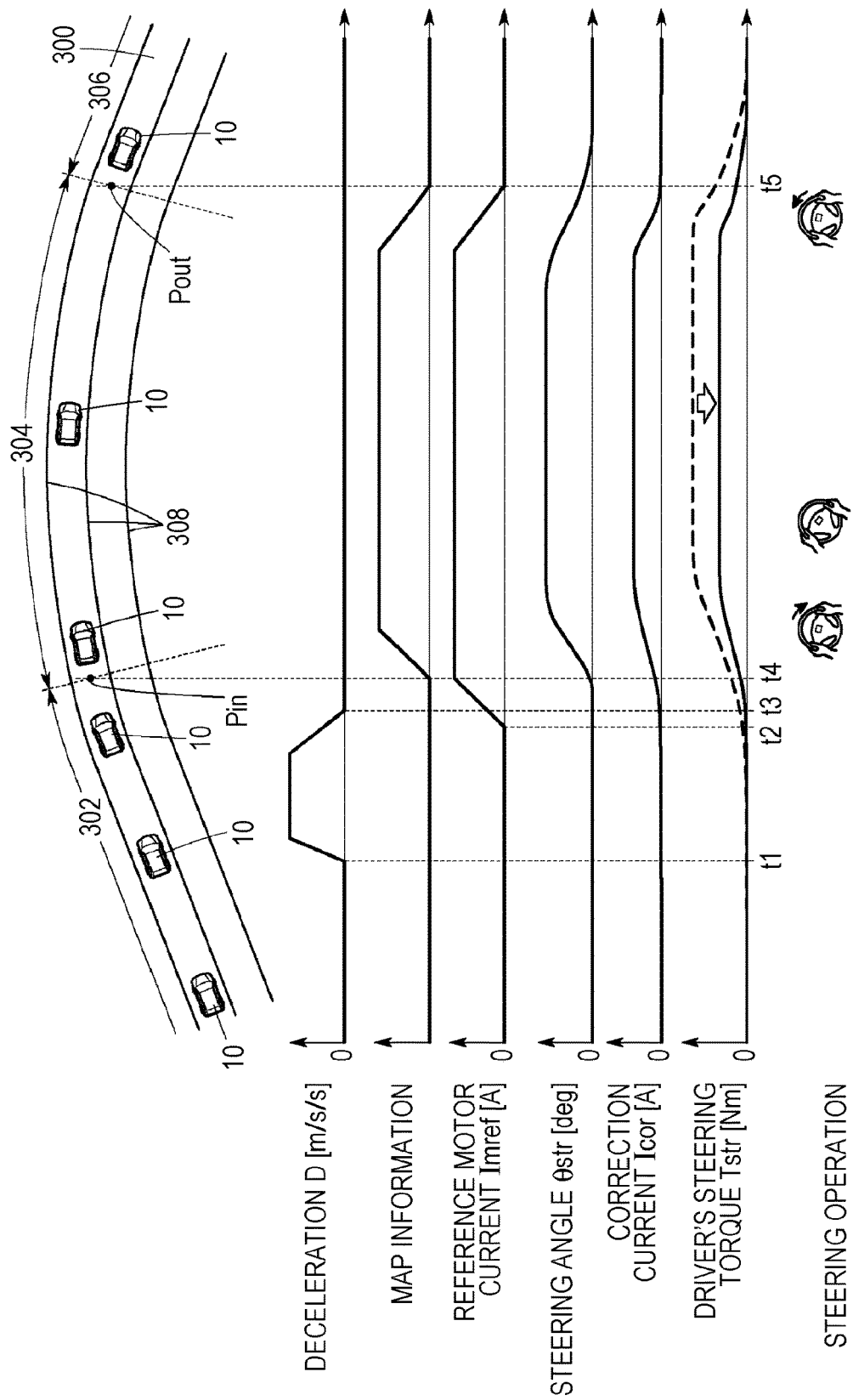
FIG. 4 is a diagram showing a first example of various numerical values involved in execution of the curve turning support control in the embodiment, together with a travel path of the vehicle.
Figure 5:
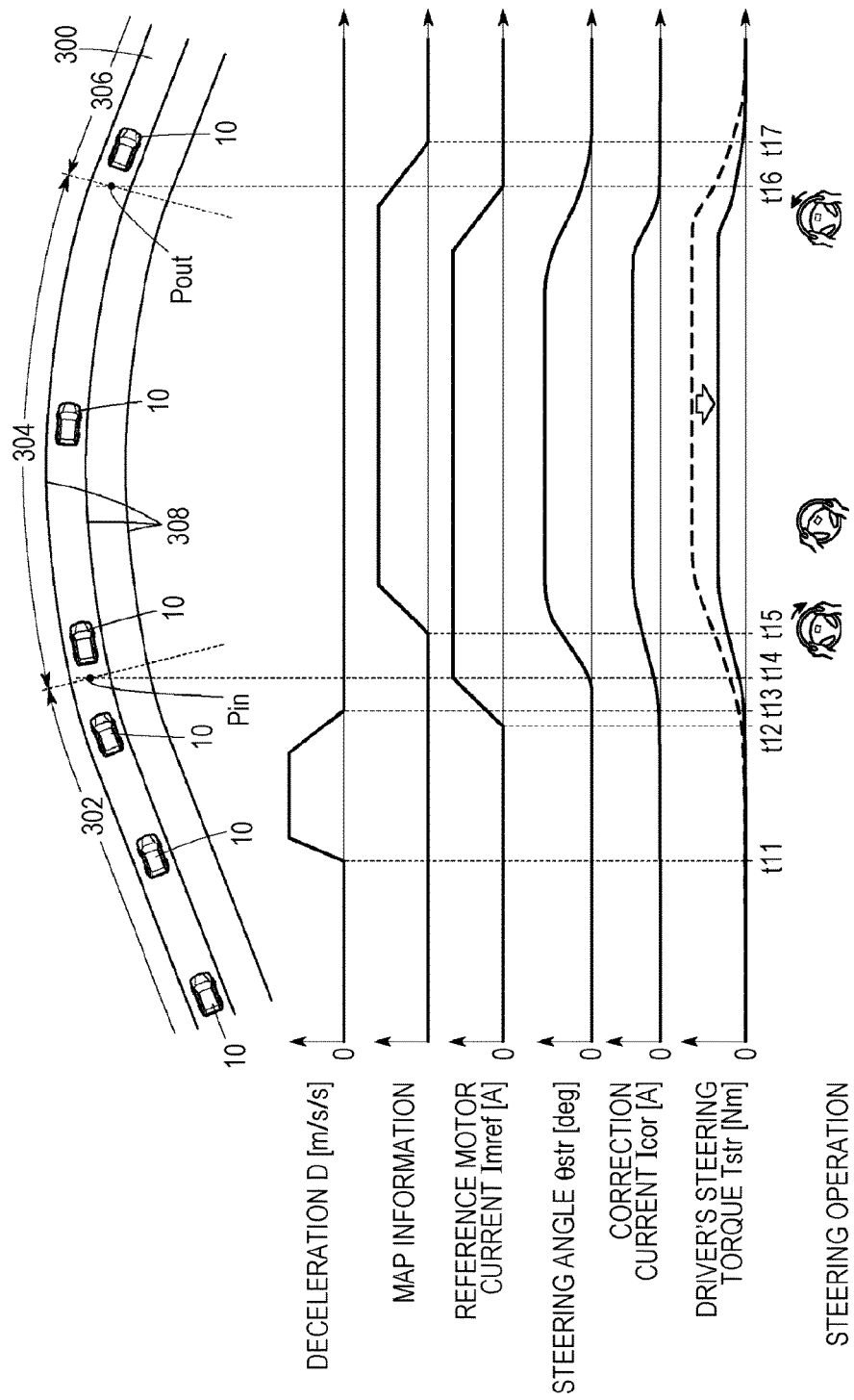
FIG. 5 is a diagram showing a second example of the various numerical values involved in execution of the curve turning support control in the embodiment, together with a travel path of the vehicle.
Figure 6:
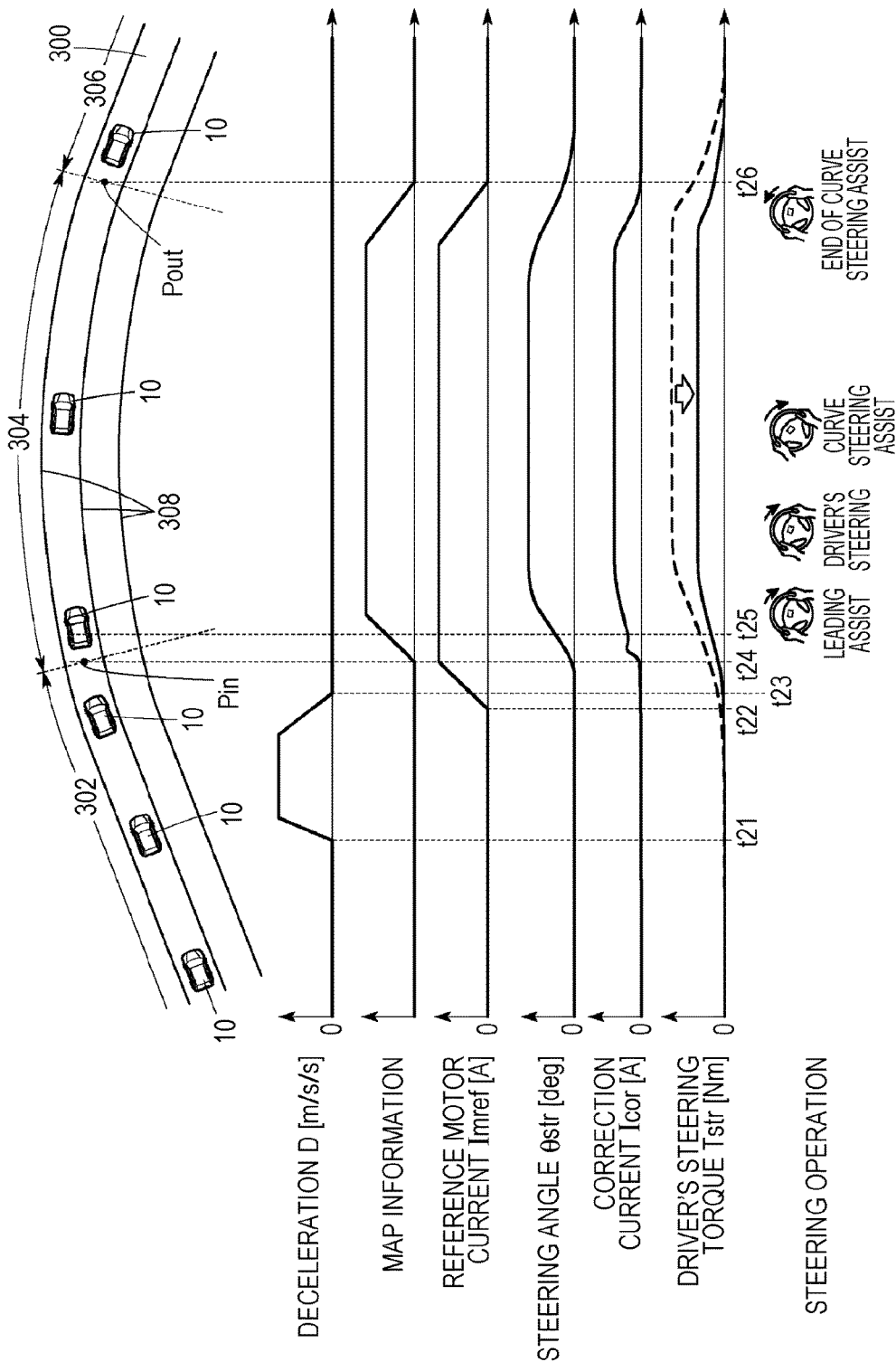
FIG. 6 is a diagram showing a third example of the various numerical values involved in execution of the curve turning support control in the embodiment, together with a travel path of the vehicle.

The vehicle travel support ECU 128 has a hardware construction that includes an input/output portion 140, a computation portion 142, and a storage portion 144. The ECU 128 detects from front images If (camera images) acquired by the camera 120 the lane lines 308 (the white lines or boundary lines) at both sides of the vehicle 10 (FIGS. 4 to 6). Then, the ECU 128 controls the EPS motor 28 so as to assist the vehicle 10 in traveling, for example, along the middle between the two lane lines 308. Incidentally, FIGS. 4 to 6 show a case in which the vehicle 10 keeps left.

The computation portion 142 performs overall control of the vehicle travel support system 14 and includes a lane detection portion 150 and a vehicle travel support portion 152. The lane detection portion 150 detects the lane lines 308 marked on a travel path 300 (FIGS. 4 to 6) of the vehicle 10 from the image information Ic (front images If) acquired by the camera 120. The vehicle travel support portion 152 executes a vehicle travel support control of assisting so as to keep the vehicle 10 between the lane lines 308. Note that, in this embodiment, the vehicle travel support control is executed, with the vehicle speed V being in the range of, for example 30 to 120 [km/h].

A2. Various Controls

A2-1. Summary

Next, controls by the EPS ECU 36 and the vehicle travel support ECU 128 in this embodiment will be described. The EPS ECU 36 executes the steering assist control. The vehicle travel support ECU 128 executes the vehicle travel support control that includes a curve turning support control. The curve turning support control is a control of assisting the vehicle 10 in turning along the curve 304 by adjusting the vehicle travel support force Fda.

A2-2. Steering Assist Control

Figure 2:
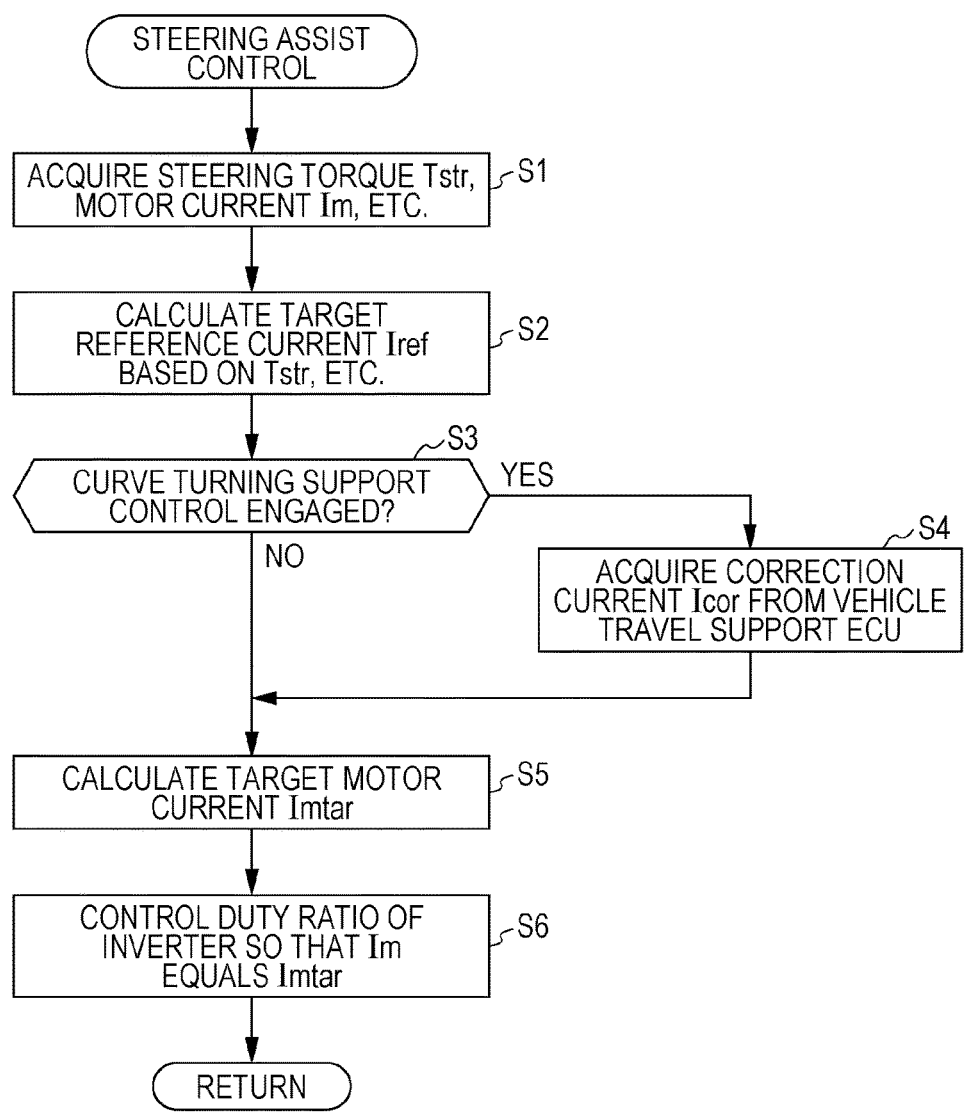
FIG. 2 is a flowchart of a steering assist control in the embodiment.

FIG. 2 is a flowchart of the steering assist control in this embodiment. As stated above, the steering assist control controls the steering assist force Fm for assisting the driver in steering. The steering assist force Fm can contain a component of the input amplification force Famp and a component of the vehicle travel support force Fda. The steering assist force Fm is exhibited as a torque and acts in the same direction as the driver's steering torque Tstr. Alternatively, as described later, the steering assist force Fm may be set in the opposite direction to the driver's steering torque Tstr and caused to act as a counterforce. The EPS ECU 36 repeatedly performs the process shown in FIG. 2 in a predetermined first operation cycle (e.g., a cycle of several microseconds to several hundred milliseconds).

In step S1 in FIG. 2, the EPS ECU 36 acquires the steering torque Tstr, the motor current Im, etc. Necessary values other than the steering torque Tstr and the motor current Im include, for example, values necessary to generate the steering assist force Fm in the related-art EPS apparatus 12 (e.g., vehicle yaw rate Yr or lateral acceleration G).

In step S2, the EPS ECU 36 calculates a target reference current Iref on the basis of the steering torque Tstr or the like. The target reference current Iref is a value of the motor current Im which corresponds to the input amplification force Famp and, basically, increases in absolute value if the steering torque Tstr increases in absolute value. Note that, for calculation of the target reference current Iref, a so-called inertia control, a damper control, etc., may be used.

In step S3, the EPS ECU 36 communicates with the vehicle travel support ECU 128 and determines whether the vehicle travel support ECU 128 is executing the curve turning support control. If the curve turning support control is not being executed (NO in S3), the process proceeds to step S5.

If the curve turning support control is being executed (YES in S3), the process proceeds to step S4, in which the EPS ECU 36 acquires from the vehicle travel support ECU 128 a correction current Icor for correcting the target reference current Iref. The correction current Icor is a correction value of the motor current Im which is used for the curve turning support control by the vehicle travel support ECU 128, and corresponds to the vehicle travel support force Fda. Details of the correction current Icor will be described later with reference to FIG. 3 and the like.

After step S3 or S4, the EPS ECU 36 calculates a target motor current Imtar in step S5. Specifically, if the EPS ECU 36 has not acquired the correction current Icor from the vehicle travel support ECU 128, the EPS ECU 36 sets the target reference current Iref directly as the target motor current Imtar (Imtar←Iref). If the EPS ECU 36 has acquired the correction current Icor from the vehicle travel support ECU 128, the EPS ECU 36 adds the correction current Icor to the target reference current Iref to set a target motor current Imtar (Imtar←Iref+Icor).

In step S6, the EPS ECU 36 changes the output of the motor 28 by controlling the duty ratio of the inverter 30 so that the motor current Im becomes equal to the target motor current Imtar.

A2-3. Curve Turning Support Control

A2-3-1. Overall Flow of Curve Turning Support Control

Figure 3:
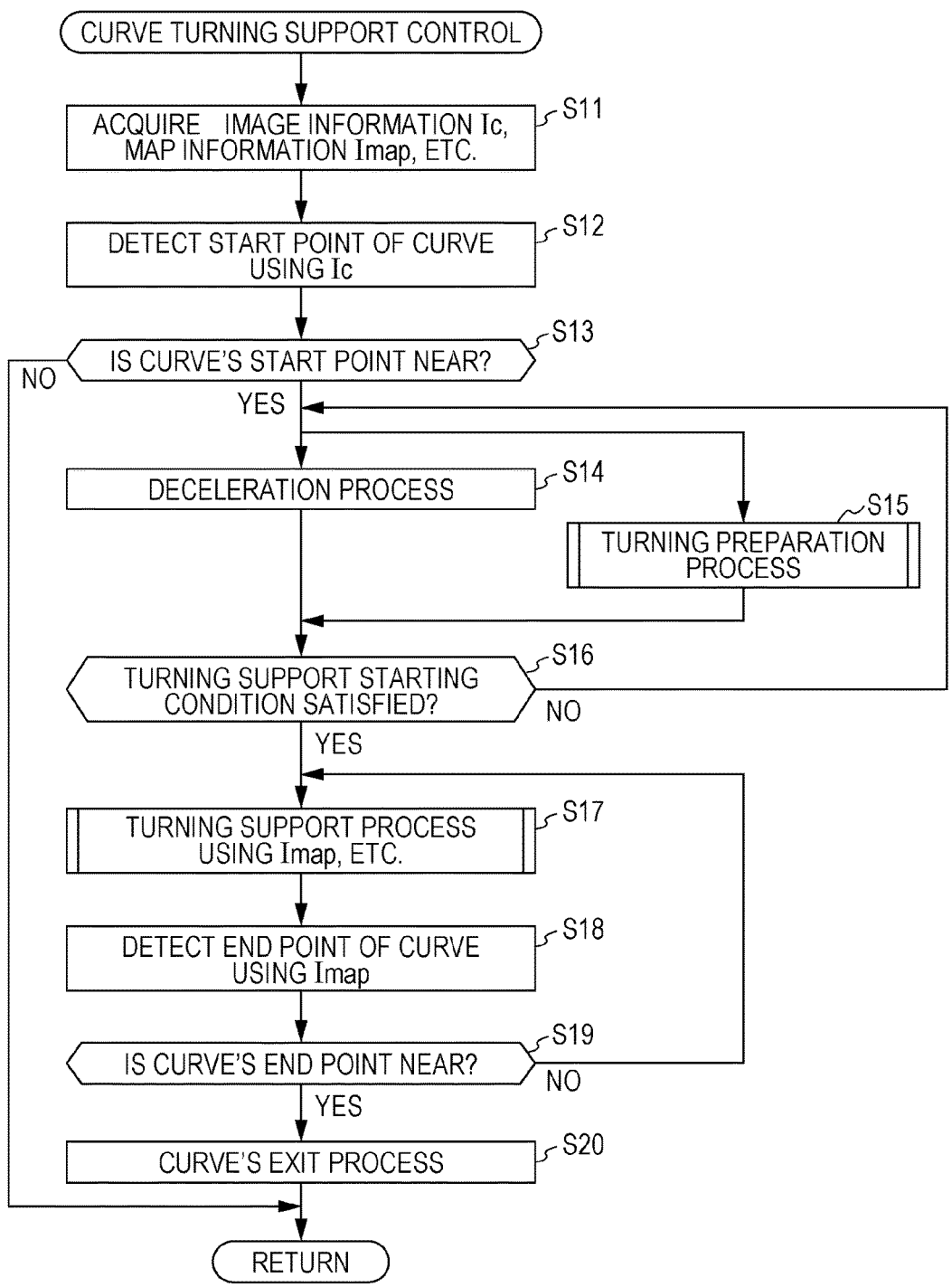
FIG. 3 is a flowchart of a curve turning support control in the embodiment.

FIG. 3 is a flowchart of the curve turning support control in the embodiment. FIGS. 4 to 6 show first to third examples of various numerical values involved in execution of the curve turning support control in the embodiment, together with the travel path 300 of the vehicle 10. As stated above, the curve turning support control is a control of assisting the vehicle 10 in turning along the curve 304 by adjusting the vehicle travel support force Fda. The vehicle travel support force Fda is exhibited as a torque and is in the same direction as the driver's steering torque Tstr. Alternatively, as stated later, the steering assist force Fm may be in the opposite direction to the driver's steering torque Tstr and caused to act as a counterforce. The vehicle travel support ECU 128 repeatedly performs the process shown in FIG. 3 in a predetermined second operation cycle (e.g., a cycle of several microseconds to several hundred milliseconds).

In FIGS. 4 to 6, the vehicle 10 is traveling on the travel path 300. The travel path 300 includes a straight path 302, the curve 304, and a straight path 306. Furthermore, the travel path 300 includes the lane lines 308 that are white lines at both sides of the travel path 300. Furthermore, in each of FIGS. 4 to 6, an interrupted line regarding the driver's steering torque Tstr represents a characteristic in a comparative example in which the turning support process in the embodiment is not performed.

In step S11 in FIG. 3, the vehicle travel support ECU 128 acquires the image information Ic (including front images If), the map information Imap, etc. Necessary values other than the image information Ic and the map information Imap include, for example, the vehicle speed V, the steering angle θstr, and the vehicle yaw rate Yr (or lateral acceleration G).

In step S12, the ECU 128 detects the start point Pin (entrance) of the curve 304 by using front images if from the image information Ic. For example, the ECU 128 performs edge detection within the front images If to detect the lane lines 308. Then, the ECU 128 calculates tangent lines to the lane lines 308 and detects as the start point Pin of the curve 304 a point where the slope of the tangent line to the lane lines 308 becomes equal to or greater than a first angle threshold value.

In step S13, the ECU 128 determines whether the start point Pin of the curve 304 has come near (time t1 in FIG. 4, time t11 in FIG. 5, and time t21 in FIG. 6). Concretely, the ECU 128 determines whether the distance L1 to the start point Pin has become equal to less than a distance threshold value THl1. If the start point Pin is not near (NO in S13), the ECU 128 ends the present process and returns to step S11. If the start point Pin is near (YES in S13), the ECU 128 executes a deceleration process in step S14 and executes a turning preparation process in step S15.

The deceleration process is a process of decelerating the vehicle 10 so that the vehicle speed V will become equal to a target curve-turning vehicle speed Vcvtar when the vehicle 10 reaches the start point Pin. The target curve-turning vehicle speed Vcvtar is a target value of the vehicle speed V calculated on the basis of the radius R of the curve 304 and the speed limit. As for the deceleration process, the ECU 128 sets a target deceleration Dtar from a relation between the distance L1 to the start point Pin and the vehicle speed V, and decelerates the vehicle 10 so that the actual deceleration D (absolute value) becomes equal to or greater than a target deceleration Dtar (absolute value). To decelerate the vehicle 10, the ECU 128 uses a friction brake apparatus (not shown) (and/or engine brake and/or regenerative brake).

Furthermore, in the deceleration process, the ECU 128 may cause generation of a counterforce to an accelerator pedal (not shown) (pedal counterforce) in order to notify the driver of a deceleration timing. Note that the occurrence of positive decelerations D from time t1 to t3 in FIG. 4, from time t11 to t13 in FIG. 5, from time t21 to t23 in FIG. 6 are results of the deceleration process but may instead be caused by the driver's spontaneous operation.

In addition, in the deceleration process, when the driver does not perform deceleration operation or the deceleration operation performed by the driver is not sufficient, automatic brake may be engaged.

The turning preparation process in step S15 is a process that the vehicle 10 performs before starting to turn. Details of the turning preparation process will be described with reference to FIG. 7.

In step S16, the ECU 128 determines whether a turning support starting condition has been satisfied. Examples of the turning support starting condition that can be used include a condition that the driver has operated the steering wheel 20, a condition that the vehicle 10 has reached the start point Pin of the curve 304, a condition that the vehicle 10 has reached a predetermined distance set with reference to the start point Pin.

When the turning support starting condition is not satisfied (NO in S16), steps S14 and S15 are repeated. When the turning support starting condition is satisfied (YES in S16), the process proceeds to step S17.

In step S17, the ECU 128 executes a turning support process of assisting in the turning of the vehicle 10 along the curve 304 (at time t4 in FIG. 4, time t14 in FIG. 5, and time t24 in FIG. 6). Details of the turning support process will be described later with reference to FIG. 8.

Subsequently, in step S18, the ECU 128 detects the end point Pout (exit) of the curve 304 by using front images if from the image information Ic. Specifically, the ECU 128 performs edge detection within the front images If to detect the lane lines 308. Then, the ECU 128 calculates tangent lines to the lane lines 308, and detects as the end point Pout of the curve 304 a point where the slope of a tangent line to the lane lines 308 becomes equal to or less than a second angle threshold value.

In step S19, the ECU 128 determines whether the vehicle 10 has come near the end point Pout of the curve 304. Concretely, the ECU 128 determines whether the distance L2 to the end point Pout has become equal to or less than a distance threshold value THl2. When the end point Pout is not near (NO in S19), the process returns to step S17. When the end point Pout is near (YES in S19), the process proceeds to step S20.

In step S20, the ECU 128 executes an exit process for exiting the curve 304. In the exit process, the ECU 128 reduces the steering assist force Fm (the vehicle travel support force Fda) so that the vehicle turning support process ends at the end point Pout of the curve 304 detected on the basis of the image information Ic (front images If). Thus, it becomes possible to end the vehicle turning support for the curve 304 which uses information about the radius R included in the map information Imap in accordance with the end point Pout of the curve 304 detected on the basis of the image information Ic. Therefore, the vehicle turning support process can be ended with high accuracy.

A2-3-2. Turning Preparation Process

Figure 7:
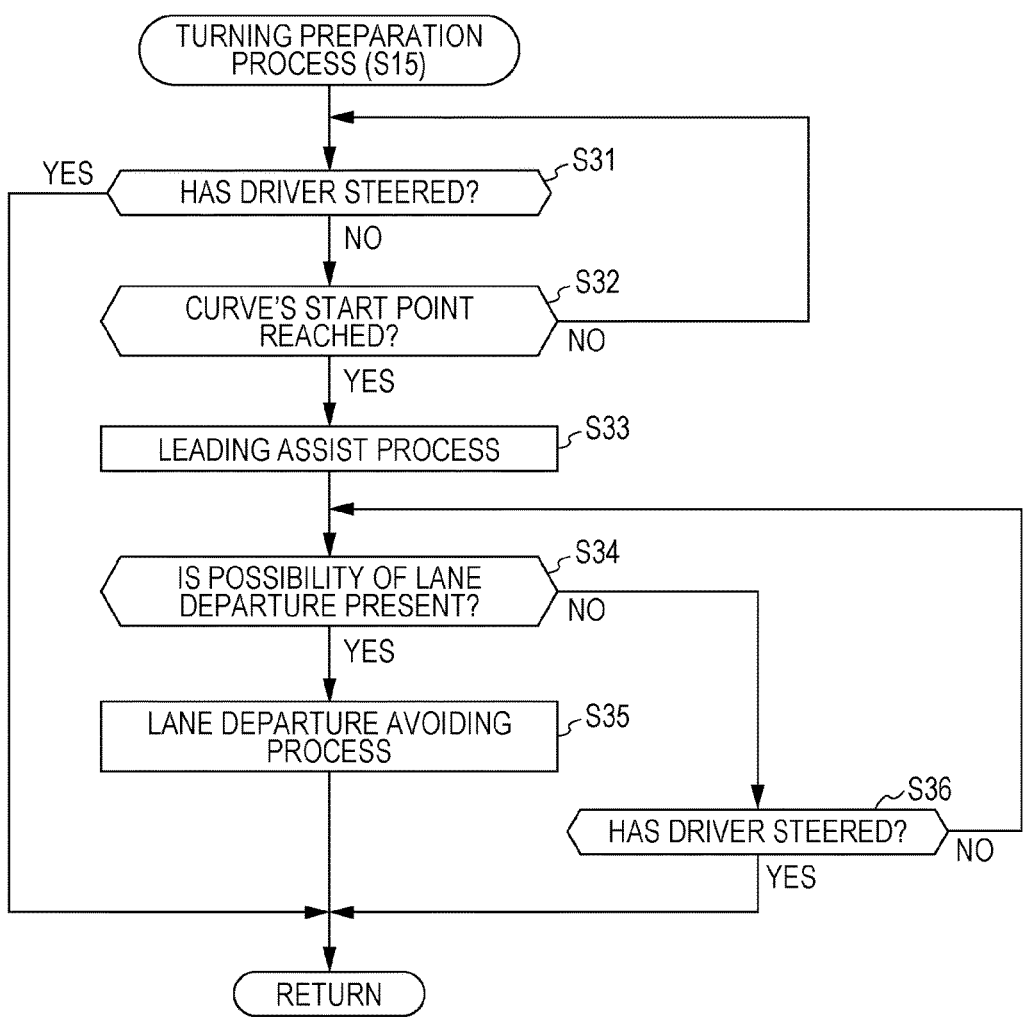
FIG. 7 is a flowchart of a vehicle turning preparation process (details of step S15 in FIG. 3) in the embodiment.

FIG. 7 is a flowchart of the turning preparation process in the embodiment (illustrating details of step S15 in FIG. 3). As in the foregoing, the turning preparation process is a process that is performed before the vehicle 10 starts turning (or before the driver starts operating the steering wheel 20).

In step S31 in FIG. 7, the vehicle travel support ECU 128 determines whether there has been an operation performed on the steering wheel 20 by the driver in order to turn the curve 304. When there has been an operation performed on the steering wheel 20 by the driver (YES in S31), the ECU 128 ends the present process. If there has not been an operation on the steering wheel 20 by the driver (NO in S31), the ECU 128 proceeds to step S32.

In step S32, the ECU 128 determines whether the vehicle 10 has reached the start point Pin (entrance) of the curve 304. If the vehicle 10 has not reached the start point Pin (NO in S32), the process returns to step S31. If the vehicle 10 has reached the start point Pin (YES in S32), it means that the driver has not operated the steering wheel 20 although the driver ought to have started operating the steering wheel 20. In this case, the process proceeds to step S33.

In step S33, the ECU 128 executes a leading assist process of prompting the driver to operate the steering wheel 20. In the leading assist process, the motor 28 is operated even when the driver has not operated the steering wheel 20. This causes the vehicle 10 to gently generate the steering assist force Fm (the vehicle travel support force Fda) (during the period from t24 to t25 in FIG. 6).

In step S34, the ECU 128 determines whether there is possibility of the vehicle 10 departing from the lane lines 308. This determination is performed on the basis of, for example, the slope of the movement track of the vehicle 10 relative to the lane lines 308, the vehicle speed V, etc.

If there is a possibility of the vehicle 10 departing from the lane lines 308 (YES in S34), the ECU 128 executes in step S35 a lane departure avoiding process for avoiding departure of the vehicle 10 from the lane lines 308. In the lane departure avoiding process, the ECU 128 sets a correction current Icor that generates a steering assist force Fm needed in order to avoid departure from the lane lines 308.

Referring back to step S34, if there is not a possibility of the vehicle 10 departing from the lane lines 308 (NO in S34), the ECU 128 determines in step S36 whether there is an operation of the steering wheel 20 performed by the driver. If there is no operation of the steering wheel 20 performed by the driver (NO in S36), the process returns to step S34. If there has been an operation of the steering wheel 20 performed by the driver (YES in S36), it means that the turning support starting condition has been satisfied, so that the ECU 128 ends the present execution of the turning preparation process.

A2-3-3. Vehicle Turning Support Process

FIG. 8 is a flowchart of the vehicle turning support process in the embodiment (illustrating details of step S17 in FIG. 3). As in the foregoing, the turning support process is a process of assisting in the turning of the vehicle 10 along the curve 304.

In step S41, the ECU 128 determines whether the current switching process that is executed stepwise in step S47 described below has been completed. Details of the current switching process will be described later in conjunction with step S47.

When the current switching process is not completed (NO in S41), the ECU 128 calculates in step S42 the target yaw rate Ytar on the basis of the curve radius R contained in the map information Imap and the vehicle speed V from the vehicle speed sensor 32. Concretely, the value obtained by dividing the vehicle speed V by the radius R is set as the target yaw rate Ytar (Ytar=V/R).

In step S43, the ECU 128 calculates the reference motor current Imref on the basis of the target yaw rate Ytar. The reference motor current Imref is a current necessary to generate the steering assist force Fm (the vehicle travel support force Fda) necessary to achieve the target yaw rate Ytar (from time t2 to t5 in FIG. 4, from time t12 to t16 in FIG. 5, and from time t22 to t26 in FIG. 6). The greater the target yaw rate Ytar (absolute value), the greater the reference motor current Imref is made. The reference motor current Imref can be set by using a map (reference motor current map) (not shown) that is stored in the storage portion 144.

In step S44, the ECU 128 calculates the correction factor α on the basis of the curve radius R and the steering angle θstr. The correction factor α is a factor for reflecting effects of the curve radius R and the steering angle θstr in the target yaw rate Ytar. For example, the smaller the curve radius R is (the sharper the curve 304 is), the greater the correction factor α is made. Furthermore, the greater the steering angle θstr is, the greater the correction factor α is made. The correction factor α can be set by using a map (correction factor map) (not shown).

In step S45, the ECU 128 calculates a first reference curve current I1cvref by multiplying the reference motor current Imref by the correction factor α (I1cvref←Imref×α). Note that since the first reference curve current I1cvref is used immediately after the turning support starting condition is satisfied (YES in S16 in FIG. 3), the calculation of the first reference curve current I1cvref may be included in the turning preparation process (FIG. 7) as a part of the process (e.g., between steps S31 and S32).

In step S46, the ECU 128 determines whether the vehicle yaw rate Yr is equal to or greater than the target yaw rate Ytar. When the vehicle yaw rate Yr is equal to or greater than the target yaw rate Ytar (YES in S46), the ECU 128 executes an electric current switching process in step S47. The current switching process a process of switching from the first reference curve current I1cvref to a second reference curve current I2cvref stepwise. Note that if the lateral acceleration G is used instead of the vehicle yaw rate Yr, the lateral acceleration G is compared with a target lateral acceleration Gtar.

In step S48, the ECU 128 calculates the second reference curve current I2cvref on the basis of the vehicle yaw rate Yr and the like. Specifically, during the switching from the target yaw rate Ytar to the vehicle yaw rate Yr in the current switching process (S47), the ECU 128 calculates the second reference curve current I2cvref by using a value for the switching. When the current switching process (S47) has been completed, the ECU 128 calculates the second reference curve current I2cvref on the basis of the vehicle yaw rate Yr.

The second reference curve current I2cvref is a current necessary to generate the steering assist force Fm (the vehicle travel support force Fda) that accords with the vehicle yaw rate Yr and the like. The greater the vehicle yaw rate Yr (absolute value) and the like, the greater the second reference curve current I2cvref is made. The second reference curve current I2cvref can be set by using a map (second reference curve current map) (not shown) that is stored in the storage portion 144.

In step S49, the ECU 128 sets the second reference curve current I2cvref as a correction current Icor.

Referring back to step S46, when the vehicle yaw rate Yr is not equal to or greater than the target yaw rate Ytar (NO in S46), the ECU 128 sets, in step S50, the first reference curve current I1cvref as the correction current Icor.

A3. Effects of the Embodiment

As described above, according to this embodiment, the deceleration process prior to the entry to the curve 304 (a deceleration support in S14 in FIG. 3) and the turning preparation process (a turning support in S15) are performed on the basis of the start point Pin of the curve 304 (FIGS. 4 to 6) detected on the basis of front images If taken by the camera 120 (the image pickup apparatus), and the vehicle turning support process (a turning support in S17) for turning the curve 304 is performed by using the information on the radius R of the curve 304 contained in the map information Imap. This makes it possible to perform a suitable deceleration support and a suitable vehicle turning support with reference to the start point Pin of the curve 304 detected with highly accuracy by using the front images If and perform a highly accurate vehicle turning support for the curve 304 based on the map information Imap. Therefore, this embodiment can be suitably used, for example, in the case where portions of the lane lines 308 of the curve 304 are not clear or the case where the radius R of the curve 304 is so small that the radius R cannot be highly accurately detected merely from the image information ic.

There are cases where the present position Pc detected by the GPS antenna 122 and the map information provision apparatus 124 has an error and use of the present position Pc and the map information Imap combined will result in an erroneous deviation of the start point Pin of the curve 304 (see the map information from time t15 to t17 in FIG. 5). In this embodiment, the start point Pin of the curve 304 is detected on the basis of the front images If, so that the vehicle turning support process can be started at an appropriate timing.

In addition, by performing the vehicle turning support in accordance with the shape of the curve 304, it becomes possible to inhibit a phenomenon in which the steering torque Tstr that needs to be applied differs between the time of turning the steering wheel 20 and the time of returning the steering wheel 20 as in the common power steering characteristic (i.e., a characteristic based on the target reference current Iref). Therefore, it becomes easy to maintain or correct the steering angle during the turning along the curve 304. Incidentally, a reason why turning the steering wheel 20 and returning the steering wheel 20 require different steering torques Tstr is that self-aligning torque occurs when the vehicle 10 turns. Due to the self-aligning torque, returning the steering wheel 20 requires less steering torque Tstr than turning the steering wheel 20.

In this embodiment, the vehicle travel support ECU 128 (the control apparatus) starts the vehicle turning support (S17 in FIG. 3) for the curve 304 which uses the radius R of the curve 304, when the driver has operated the steering wheel 20 (YES in S16 in FIG. 3 and YES in S36 in FIG. 7). Thus, it becomes possible to perform a vehicle turning support in which the driver's taste is reflected. It also becomes possible to avoid giving the driver a sense of strangeness about the steering assist force Fm.

In the embodiment, the ECU 128 (the control apparatus) computes the first reference curve current I1cvref that represents the first steering assist force Fm1 that is the steering assist force Fm that reflects the target yaw rate Ytar based on the curve radius R and the vehicle speed V and also computes the second reference curve current I2cvref that represents the second steering assist force Fm2 that is the steering assist force Fm that reflects the vehicle speed V and the vehicle yaw rate Yr of the vehicle 10 (S45 and S48 in FIG. 8). After the vehicle turning support based on the first reference curve current I1Cvref starts, the reference curve current is changed gradually or stepwise from the first reference curve current I1cvref to the second reference curve current I2cvref. After that, the vehicle turning support is performed on the basis of the second reference curve current I2cvref. Thus, it is possible to achieve a smooth transition from the first steering assist force Fm1 that reflects the radius R of the curve to the second steering assist force Fm2 that reflects the vehicle yaw rate Yr.

In this embodiment, the ECU 128 (the control apparatus) causes the steering assist force Fm (the vehicle travel support force Fda) to be generated with reference to the start point Pin of the curve 304 detected on the basis of front images If (S33 in FIG. 7). Thus, even if the driver does not perform steering or the amount of steering performed is small, the steering assist force Fm (the vehicle travel support force Fda) is generated so that the vehicle 10 can smoothly turn the curve 304.

In this embodiment, the ECU 128 (the control apparatus), while performing the vehicle turning support (S17 in FIG. 3) for the curve 304 by using the information about the radius R of the curve 304 contained in the map information Imap, reduces the steering assist force Fm (the vehicle travel support force Fda) so that the vehicle turning support ends at the end point Pout of the curve 304 detected on the basis of front images if (820 in FIG. 3). Thus, the vehicle turning support for the curve 304 which uses the radius R of the curve 304 contained in the map information Imap can be ended in accordance with the end point Pout of the curve 304 detected on the basis of front images If. Therefore, it becomes possible to highly accurately end the vehicle turning support.

In the embodiment, if, when the vehicle 10 has passed the steering-requiring position set with reference to the start point Pin of the curve 304 contained in the map information Imap while the driver does not operate the steering wheel 20 (YES in S32 in FIG. 7), the ECU 128 determines from the front images If that the vehicle 10 has departed or is likely to depart from the lane lines 308 (YES in S34), then the ECU 128 (the control apparatus) causes the steering assist force Fm (the vehicle travel support force Fda) to be generated in order to avoid or recover from departure of the vehicle 10 from the lane lines 308. Thus, in the determination regarding departure of the vehicle 10 from the lane lines 308 based on front images If, the use of the information about the start point Pin of the curve 304 contained in the map information Imap makes it possible to highly accurately determine the need for the lane departure avoidance or recovery process.

According to the embodiment, while executing the vehicle turning support for the curve 304 by using the curve radius R contained in the map information Imap, the ECU 128 reduces the steering assist force Fm so that the vehicle turning support will end at the end point Pout of the curve 304 detected on the basis of front images If (S20 in FIG. 3). Therefore, it becomes possible to perform a highly accurate vehicle turning support for the curve 304 based on the map information Imap and end the vehicle turning support at an appropriate timing with reference to the end point Pout of the curve 304 detected with high accuracy by using front images If.

B. Modifications

It should be apparent that the present disclosure s not limited to the foregoing embodiment but may adopt various other constructions as well on the basis of what is mentioned in this specification. For example, the following constructions can be adopted.

B1. Objects to Which to Apply the System

In the foregoing embodiment, the vehicle travel support system 14 (the vehicle travel support apparatus) is mounted on the vehicle 10 (FIG. 1). However, the application of the vehicle travel support system of this disclosure is not limited to this embodiment, for example, from the point of view that the start point Pin of the curve 304 is detected on the basis of front images If and the radius R of the curve 304 contained in the map information Imap is used to perform the vehicle turning support for the curve 304. For example, the present disclosure may also be applied to a mobile object or a motion-capable apparatus equipped with the steering wheel 20 (or an operating element).

B2. EPS Apparatus 12

B2-1. Overall Construction of EPS Apparatus 12

The EPS apparatus 12 in the foregoing embodiment is constructed so that the EPS motor 28 transfers the steering assist force Fm to the steering shaft 42 (i.e., a so-called steering column assist type EP apparatus). However, the construction of the EPS apparatus 12 is not limited to the foregoing construction but may be any construction as long as the construction generates a steering assist force Fm. The EPS apparatus 12 may also be constructed as, for example, any one of a pinion assist type EPS apparatus, a dual pinion assist type EPS apparatus, a rack assist type EPS apparatus, and an electro-hydraulic power steering apparatus. Incidentally, in the electro-hydraulic power steering apparatus, hydraulic pressure is produced by an electric pump and then is used to generate a steering assist force Fm.

Although the foregoing embodiment adopts a construction in which the steering torque Tstr by the driver is directly transferred to the front wheels 86 (hereinafter, also referred to as "direct transfer method"), the disclosure is also applicable to steer-by-wire type electric power steering apparatuses.

B2-2. EPS Motor 28

Although in the foregoing embodiment, the EPS motor 28 is of the three-phase alternating-current brushless type, this is not restrictive. For example, the motor 28 may also be of the three-phase alternating-current brush type, the single-phase alternating-current type, or the direct-current type.

In the foregoing embodiment, the motor 28 is supplied with electric power from the low-voltage battery 38 (FIG. 1). In addition to or instead of this, an alternator, a fuel cell battery, or a high voltage battery may also be used to supply electric power to the motor 28.

B2-3. EPS ECU 36

The foregoing embodiment has been described on the assumption that the ECU 36 is mounted in the vehicle 10 (FIG. 1). However, the ECU 36 may be constructed by providing a portion of the ECU 36 in a portable terminal and connecting the portable terminal to a network to which the vehicle 10 is connected. The same may be applied to the vehicle travel support ECU 128.

B3. Vehicle Travel Support System 14 (Vehicle Travel Support Apparatus)

In the foregoing embodiment, a portion of the steering force (the steering torque Tstr) needed for the turning along the curve 304 is generated by the vehicle travel support system 14. However, this is not restrictive, for example, from the point of view that the start point Pin of the curve 304 is detected on the basis of front images If and the radius R of the curve 304 contained in the map information Imap is used to perform the vehicle turning support for the curve 304. For example, the vehicle travel support system 14 may also generate the whole steering force (steering torque Tstr) needed for the turning along the curve 304 (i.e., may perform fully automatic driving).

The foregoing embodiment has been described on the assumption that the vehicle travel support system 14 is mounted in the vehicle 10 (FIG. 1). However, the vehicle travel support system 14 may also be constructed by providing a portion of the vehicle travel support system 14 (the vehicle travel support ECU 128 and the like) in a portable terminal and connecting the portable terminal to a network to which the vehicle 10 is connected.

In the foregoing embodiment, the EPS apparatus 12 and the vehicle travel support system 14 are separate components (FIG. 1). However, for example, from the point of view that the vehicle turning support for the curve 304 is performed by using the radius R of the curve 304 which is contained in the map information Imap, the functions of the vehicle travel support system 14 may be included in the EPS apparatus 12. Alternatively, the functions of the EPS apparatus 12 may be included in the vehicle travel support system 14.

The foregoing embodiment has been described on the assumption that the GPS antenna 122 and the map information provision apparatus 124 are mounted in the vehicle 10. However, for example, the GPS antenna 122 and the map information provision apparatus 124 may be partially or entirely provided in a portable terminal and the portable terminal may be connected to a network to which the vehicle 10 is connected.

B4. Steering Assist Control (FIG. 2)

B4-1. Steering Assist Force Fm

In the steering assist control in the foregoing embodiment, the steering assist force Fm is a drive force (torque) in the same direction as the steering torque Tstr provided by the driver. However, this is not restrictive. For example, from the point of view of supporting the steering via the steering wheel 20, the steering assist force Fm may be a force that acts in the opposite direction to the steering torque Tstr (e.g., may be a counterforce).

The term "supporting the steering via the steering wheel 20" herein includes both making it easy for the driver to turn the steering wheel 20 in a direction in which the driver intends to (e.g., an operation as described in conjunction with the foregoing embodiment) and making it less easy for the driver to turn the steering wheel 20 in a direction in which the driver intends to as long as the EPS apparatus 12 is configured to directly transfer the steering torque Tstr to steering road wheels (the front wheels 86) (i.e., as long as the EPS apparatus 12 adopts a direct transfer method).

B4-2. Leading Assist Process

In the foregoing embodiment, the leading assist process of generating the steering assist force Fm (the vehicle travel support force Fda) before the driver starts operating the steering wheel 20 is performed after the vehicle 10 reaches the start point Pin of the curve 304 (YES in S32 followed by S33 in FIG. 7). However, this is not restrictive, for example, from the point of view that the vehicle turning support for the curve 304 is performed by using the radius R of the curve 304 contained in the map information Imap. For example, the ECU 128 may cause the steering assist force Fm (the vehicle travel support force Fda) to be generated before the vehicle 10 enters the curve 304. This makes it possible to notify the driver in advance that the vehicle turning support will be performed for the curve 304.

In this case, the ECU 128 may determine delay of the actual timing of the driver's steering from the reference steering timing that is the steering timing set with reference to the start point Pin of the curve 304. Furthermore, the ECU 128 may advance the timing of starting the steering assist force Fm (the vehicle travel support force Fda) prior to entry to the curve 304 according to the delay of the actual steering timing. Therefore, the timing of starting the steering assist force Fm (the vehicle travel support force Fda) prior to entry to the curve 304 can be adjusted according to the skill of the driver. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle travel support system comprising:
   an image pickup apparatus that acquires a front image of a view ahead of a vehicle;
   a lane detection apparatus that detects a lane indicated on a travel path of the vehicle in the front image acquired by the image pickup apparatus;
   a position detection apparatus that detects a present position of the vehicle;
   a map information storage apparatus that stores map information;
   an actuator that generates a steering assist force; and
   a control apparatus that assists in keeping the vehicle in the lane or avoiding departure of the vehicle from the lane by causing the actuator to generate the steering assist force, wherein
   the control apparatus
   estimates subsequent travel path of the vehicle using the present position of the vehicle and the map information,
   acquires, regarding a curve included in the estimated travel path, a curve radius contained in the map information from the map information storage apparatus,
   detects a start point of the curve using the front image and performs at least one of a vehicle turning support and a deceleration support prior to entry to the curve, based on the detected start point of the curve, and then
   performs the vehicle turning support for the curve, after entry to the curve, by using the curve radius contained in the map information by starting the vehicle turning support for the curve which uses the curve radius contained in the map information, when steering is performed by a driver of the vehicle.

2. The vehicle travel support system according to claim 1, wherein
   the control apparatus
   computes a first steering assist force and a second steering assist force, the first steering assist force being a steering assist force that reflects at least one of a target yaw rate and a target lateral acceleration that are determined based on the curve radius and vehicle speed, and the second steering assist force being a steering assist force that reflects the vehicle speed and at least one of vehicle yaw rate and lateral acceleration, and
   starts the vehicle turning support based on the first steering assist force, subsequently changes the steering assist force gradually or stepwise from the first steering assist force to the second steering assist force, and then performs the vehicle turning support using the second steering assist force.

3. The vehicle travel support system according to claim 2, wherein the second steering assist force reflects at least one of actual vehicle yaw rate and actual lateral acceleration.

4. The vehicle travel support system according to claim 1, wherein the control apparatus causes the steering assist force to be generated by using as a reference the start point of the curve which is detected based on the front image.

5. The vehicle travel support system according to claim 1, wherein the control apparatus, while performing the vehicle turning support for the curve by using the curve radius contained in the map information, detects an end point of the curve using the front image and reduces the steering assist force so that the vehicle turning support ends at the detected end point of the curve.

6. The vehicle travel support system according to claim 1, wherein the control apparatus determines an electric current that maintains at least one of a vehicle yaw rate and a lateral acceleration that currently occur on the vehicle, and performs at least one of the deceleration support and the vehicle turning support based on the determined current.

7. The vehicle travel support system according to claim 6, the control apparatus causes the steering assist force to be generated before the vehicle enters the curve.

8. The vehicle travel support system according to claim 6, wherein the actuator is driven by the electric current, and the control apparatus provides the electric current to the actuator to maintain the at least one of the vehicle yaw rate and the lateral acceleration that currently occur on the vehicle.

9. The vehicle travel support system according to claim 1, the control apparatus causes the steering assist force to be generated before the vehicle enters the curve.

10. The vehicle travel support system according claim 9, wherein the control apparatus determines a delay of an actual steering timing at which steering is performed by a driver of the vehicle from a reference steering timing that is a steering timing set with reference to the start point of the curve, and advances a start timing of generating the steering assist force prior to entry to the curve, according to the delay of the actual steering timing.

11. The vehicle travel support system according to claim 1, wherein if, the vehicle has passed a steering-requiring position set with reference to the start point of the curve contained in the map information while the driver does not operate the steering wheel, the control apparatus determines from the front image that there is departure of the vehicle from the lane or possibility of departure of the vehicle from the lane, then the control apparatus causes the steering assist force to be generated in order to avoid or recover from departure of the vehicle from the lane.

12. A vehicle travel support method that uses a vehicle travel support system that includes an image pickup apparatus that acquires a front image of a view ahead of a vehicle;

a lane detection apparatus that detects a lane indicated on a travel path of the vehicle in the front image acquired by the image pickup apparatus;

a position detection apparatus that detects a present position of the vehicle;

a map information storage apparatus that stores map information;

an actuator that generates a steering assist force; and a control apparatus that assists in keeping the vehicle in the lane or avoiding departure of the vehicle from the lane by causing the actuator to generate the steering assist force, wherein the vehicle travel support method causing the control apparatus to:

estimate subsequent travel path of the vehicle using the present position of the vehicle and the map information, acquire, regarding a curve included in the estimated travel path, a curve radius contained in the map information from the map information storage apparatus, detect a start point of the curve using the front image and perform a vehicle turning support or a deceleration support prior to entry to the curve, based on the detected start point of the curve, and then start the vehicle turning support for the curve, after entry to the curve, by using the curve radius contained in the map information, when steering is performed by a driver of the vehicle.

13. The vehicle travel support method according to claim 12, wherein the vehicle travel support method causing the control apparatus to:

while performing the vehicle turning support for the curve by using the curve radius contained in the map information, detect an end point of the curve using the front image and reduce the steering assist force so that the vehicle turning support ends at the detected end point of the curve.

14. A vehicle comprising the vehicle travel support system according to claim 1.

15. A portable terminal comprising the vehicle travel support system according to claim 1.

* * * * *